(12) United States Patent
Yang et al.

(10) Patent No.: US 11,601,897 B2
(45) Date of Patent: Mar. 7, 2023

(54) DYNAMIC ADJUSTMENT OF TRANSMISSION PARAMETERS

(71) Applicant: Apple Inc., Cupertino, CA (US)

(72) Inventors: Xi Yang, Saratoga, CA (US); Jianxuan Tu, Cupertino, CA (US); Qiyang Wu, Fremont, CA (US); Peter M. Agboh, Burlingame, CA (US); Vusthla Sunil Reddy, Cupertino, CA (US); Mark D. Neumann, El Granada, CA (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 16/887,832

(22) Filed: May 29, 2020

(65) Prior Publication Data

US 2020/0383068 A1    Dec. 3, 2020

Related U.S. Application Data

(60) Provisional application No. 62/855,526, filed on May 31, 2019.

(51) Int. Cl.
| | |
|---|---|
| *H04W 52/36* | (2009.01) |
| *H04W 52/28* | (2009.01) |
| *H04W 72/04* | (2009.01) |
| *H04W 72/10* | (2009.01) |
| *H04W 72/044* | (2023.01) |

(52) U.S. Cl.
CPC ....... *H04W 52/367* (2013.01); *H04W 52/283* (2013.01); *H04W 72/0473* (2013.01); *H04W 72/10* (2013.01)

(58) Field of Classification Search
CPC ............ H04W 52/367; H04W 52/283; H04W 72/0473; H04W 72/10; H04W 52/34; H04W 52/30; H04W 52/28
USPC ......................................................... 370/329
See application file for complete search history.

(56) References Cited

U.S. PATENT DOCUMENTS

| | | | |
|---|---|---|---|
| 2014/0187281 A1* | 7/2014 | Faraone | H04W 52/146 455/522 |
| 2015/0119103 A1* | 4/2015 | Ngai | H04W 88/06 455/552.1 |
| 2018/0070320 A1* | 3/2018 | Forrester | H04W 52/30 |

* cited by examiner

*Primary Examiner* — Gbemileke J Onamuti
(74) *Attorney, Agent, or Firm* — Fay Kaplun & Marcin, LLP (57) ABSTRACT

Manners of complying with SAR limits at a user equipment (UE) configured to establish a first communication connection using a first radio and a second communication connection using a second radio. The UE determines that a first application associated with the first communication connection is to be prioritized over a second application associated with the second communication connection, determines a specific absorption rate (SAR) value associated with the UE and modifies, responsive to the SAR value associated with the UE, a parameter associated with the first radio or the second radio based on at least the priority of the first application relative to the second application.

20 Claims, 6 Drawing Sheets

Rank Table
300

| Radio 305 | Rank 310 | Application Preference 315 |
|---|---|---|
| First Radio (2.4 GHz) | 1 | Range |
| Second Radio (5 GHz) | 2 | Latency |

320 — First Radio row
325 — Second Radio row

Element Table 600

| Radio 605 | Allowed Transmit Power 610 | Duty Cycle 615 | Power Step Size 620 | Duty Cycle Step Size 625 |
|---|---|---|---|---|
| First Radio (2.4 GHz) | 30 dBm | 50% | 1 dB | 1% |
| Second Radio (5 GHz) | 30 dBm | 50% | 1 dB | 1% |

Fig. 6 ively embodiments.

DYNAMIC ADJUSTMENT OF TRANSMISSION PARAMETERS

PRIORITY CLAIM/INCORPORATION BY REFERENCE

This application claims priority to U.S. Provisional Application 62/855,526 filed on May 31, 2019 entitled "Dynamic Adjustment Of Transmission Parameters," the entirety of which is incorporated by reference herein.

BACKGROUND

A user equipment (UE) may be configured with a variety of wireless communication capabilities. Wireless communication functionality may implicate various regulations and/or standards. For example, a regulatory entity may set a maximum specific absorption rate (SAR) limit to regulate exposure to radio frequency (RF) energy. Due to the SAR limit, the UE may implement various mitigation techniques related to the amount of RF energy emitted by the UE to ensure that the SAR associated with the UE does not exceed the SAR limit.

SUMMARY

Some exemplary embodiments are related to a method performed by a user equipment (UE) configured to establish a first communication connection using a first radio and a second communication connection using a second radio. The method includes determining that a first application associated with the first communication connection is to be prioritized over a second application associated with the second communication connection, determining a specific absorption rate (SAR) value associated with the UE and modifying, responsive to the SAR value associated with the UE, a parameter associated with the first radio or the second radio based on at least the priority of the first application relative to the second application.

Other exemplary embodiments are related to a user equipment (UE) having a first radio, a second radio and a processor. The first radio is configured to establish a first communication connection. The second radio is configured to establish a second communication connection. The processor is configured to determine that a first application associated with the first communication connection is prioritized over a second application associated with the second communication connection, determine a specific absorption rate (SAR) value associated with the UE, and modify, responsive to the SAR value associated with the UE, a parameter associated with the first radio or the second radio based on at least the prioritization of the first application relative to the second application.

Still further exemplary embodiments are related to an integrated circuit. The integrated circuit includes circuitry configured to determine that a first application associated with a first communication connection is prioritized over a second application associated with a second communication connection, circuitry configured to determine a specific absorption rate (SAR) value associated with the UE and circuitry configured to modify, responsive to the SAR value associated with the UE, a parameter associated with the first radio or the second radio based on at least the prioritization of the first application relative to the second application.

DETAILED DESCRIPTION

The exemplary embodiments may be further understood with reference to the following description and the related appended drawings, wherein like elements are provided with the same reference numerals. The exemplary embodiments describe manners of managing the specific absorption rate (SAR) associated with a user equipment (UE). SAR generally refers to a measure of the rate at which radio frequency (RF) energy is absorbed by the human body. Throughout this description, when SAR is used in reference to a metric, SAR represents power absorbed per mass of tissue and will be expressed in units of watts per kilogram (W/kg).

Various standards and/or regulations may set a SAR limit (or threshold) to ensure that the user of a device is not exposed to a certain amount of RF energy. Accordingly, a person in proximity to a device will not be exposed to more than a predetermined threshold of RF energy, e.g., over a particular duration. The exemplary embodiments relate to a SAR limit that is based on the average SAR associated with the UE over a particular duration.

Thus, throughout this description, a SAR limit may refer to a predetermined threshold parameter that is to be compared to the average SAR associated with the UE during a time window. The duration of the time window may be based on any appropriate factor such as, but not limited to, a timer of a predetermined duration, the occurrence of a predetermined type of event or predetermined set of criteria, the duration of a network connection, measurement data, a request, user input, any combination thereof, etc. However, any reference to the time window being a particular duration or the time window being dependent on any particular factor is merely provided for illustrative purposes, the exemplary embodiments may apply to a time window of any duration and/or set based on any relevant factor.

The SAR experienced at any location relative to the UE (e.g., a three-dimensional point measured relative to the UE (hereinafter referred to as the "SAR location")) may depend on various factors. These factors may include, but are not limited to, transmit power, the angle between the source (e.g., at least one antenna) and the SAR location, the presence of objects between the source and the SAR location, the distance between the source and the SAR location, etc. As a result, the RF energy emitted by a UE from a source (e.g., at least one antenna) may cause a SAR of a first value at a first SAR location and a SAR of a second value at a second SAR location. To account for these variations, the UE may be subject to multiple different SAR limits that are each relative to a different portion of the user (e.g., head, whole body, particular number of grams of tissue, wrist, arm, leg, etc.). Further, different types of UEs may be subject to different SAR limits. However, the exemplary embodiments are not limited to a SAR limit that is relative to any specific portion of the user.

From the UE perspective, RF energy is emitted from an antenna when a radio performs a transmission. A person of ordinary skill in the art would understand that there is a direct correlation between the value of various parameters that are utilized for the operation of the radio and the SAR associated with the UE. The exemplary embodiments will be described with regard to determining the SAR associated with the UE based on the transmit power and duty cycle utilized by a radio. However, a person of ordinary skill in the art would understand that other parameters associated with the operation of a radio may be used to determine the SAR associated with the UE.

Due to the correlation between transmit power and the SAR associated with the UE, the UE may ensure compliance with the SAR limit, at least in part, by limiting the transmit power parameter for a radio to a predetermined maximum. Thus, while the UE may be capable of utilizing a transmit power of a first value, the UE may limit itself to a maximum transmit power that is less than the first value (e.g., over a particular period of time). Throughout this description, the term allowed transmit power may generally refer to the maximum transmit power that the UE may utilize while remaining in compliance with the SAR limit.

The exemplary embodiments are also described with regard to a UE that is capable of simultaneous dual-band (SDB) functionality. SDB functionality generally refers to utilizing a plurality of frequency bands for wireless communications with a network. Thus, when the UE is in an SDB operating mode, the UE may maintain a first connection that is configured to utilize a first frequency band and a second connection that is configured to utilize a second frequency band. To maintain these connections simultaneously, the UE may be equipped with multiple radios and each connection may correspond to a different radio. For example, the UE may establish a first connection in a wireless local area network (WLAN) over the 2.4 gigahertz (GHz) band using a first radio and a second network connection in the WLAN over the 5 GHz band using a second radio. Since both network connections are maintained simultaneously by different radios, the UE may perform simultaneous transmission and/or reception over both frequency bands.

In certain arrangements, the first radio configured to communicate over a first frequency band (e.g., 2.4 GHz band) and the second radio configured to communicate over a second frequency band (e.g., 5 GHz band) may share an antenna or utilize co-located antennas. In these types of arrangement, the SAR associated with the UE over a time window may be determined based on any/all of the transmit power utilized by the first radio, the transmit power utilized by the second radio, the duty cycle of the first radio and the duty cycle of the second radio. Exemplary embodiments are described with regard to limiting the SAR associated with the UE when the UE is equipped with a shared antenna or co-located antennas. However, reference to SDB or any particular arrangement of antennas and radios is merely provided for illustrative purposes. Exemplary embodiments may apply to any scenario in which the UE emits RF energy that is attributable to signaling associated with more than one wireless connection and/or frequency band.

As will be described in detail below, the exemplary embodiments relate to monitoring the SAR associated with the UE over a time window. This enables the UE to determine when the SAR associated with the UE is approaching the SAR limit and reduce an operating parameter associated with a radio of the UE to ensure that the SAR associated with the UE remains below the established SAR limit. This also enables the UE to increase an operating parameter associated with a radio of the UE to improve performance of the UE without exceeding the SAR limit. Accordingly, when the UE is maintaining a plurality of network connections and/or communicating over a plurality of frequency bands, the UE may dynamically adjust the parameters associated with each respective radio based on the SAR associated with the UE. This enables the UE to efficiently balance the user experience associated with each connection and remain in compliance with the SAR limit. Those skilled in the art will understand that the exemplary embodiments may apply to any device that is configured to comply with a parameter that is similar to the SAR limit (or the parameter(s) that influence SAR) and equipped with a plurality of radios. The exemplary embodiments may be incorporated into existing SAR verification processes, performed independently, and/or incorporated into future SAR verification processes.

Figure 1:
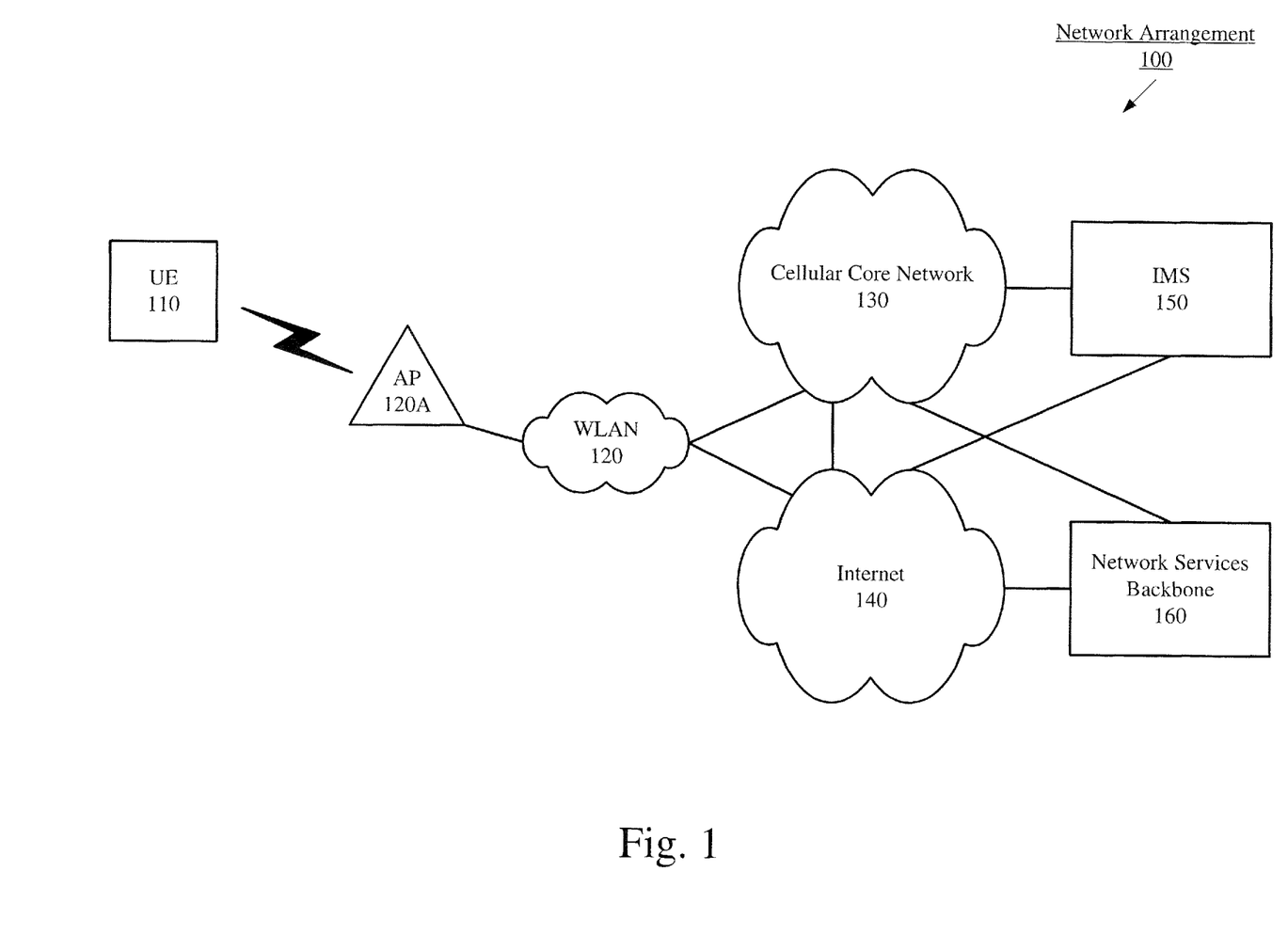
FIG. 1 shows an exemplary network arrangement according to various exemplary embodiments.

FIG. 1 shows an exemplary network arrangement 100 according to various exemplary embodiments. The exemplary network arrangement 100 includes a UE 110. Those skilled in the art will understand that the UE 110 may be any type of electronic component that is configured to transmit a wireless signal, e.g., mobile phones, tablet computers, desktop computers, smartphones, phablets, embedded devices, wearables, Internet of Things (IoT) devices, accessories, etc. It should also be understood that an actual network arrangement may include any number of UEs being used by any number of users. Thus, the example of a single UE 110 is merely provided for illustrative purposes.

When deployed in the network arrangement 100, the UE 110 may perform various operations for the purposes of SAR management. For example, as will be described in detail below, the UE 110 may monitor the SAR associated with the UE 110 over a time window. Responsive to the SAR associated with the UE 110, the UE 110 may modify an operating parameter(s) that influences the SAR associated with the UE 110. This enables the UE 110 to efficiently balance the performance of various wireless communications while remaining in compliance with the SAR limit.

Further, the exemplary network arrangement 100 includes a wireless local access network (WLAN) 120. However, the UE 110 may also communicate with other types of networks and the UE 110 may also communicate with networks over a wired connection. Therefore, the UE 110 may include an ISM chipset to communicate with the WLAN 120 and any of a plurality of further chipsets to communicate with one or more other types of networks (e.g., 5G new radio (NR) radio access network (RAN), Long-Term Evolution (LTE) RAN, Legacy RAN, etc.). In this example, the ISM chipset may be configured to support simultaneous dual-band (SDB) functionality. Accordingly, the UE 110 may maintain a first network connection with the WLAN 120 over the 2.4 GHz band and a second network connection with the WLAN over the 5 GHz band. However, this is merely exemplary and the UE 110 may communicate with the WLAN 120 over any appropriate frequency band(s). Further, in other examples, this functionality may be enabled by a plurality of ISM chipsets.

The WLAN 120 may include any type of wireless local area network (WiFi, Hot Spot, soft AP, IEEE 802.11 networks, etc.). WLANs may manage access to the network via any of a plurality of different hardware devices that are configured to send and/or receive traffic from UEs that are equipped with the appropriate ISM chipset. In the exemplary network arrangement 100, the UE 110 may connect to the WLAN 120 via an access point (AP) 120A. However, reference to an AP is merely provided for illustrative purposes. The exemplary embodiments may apply to any type of device that manages access to a WLAN.

In addition to the WLAN 120, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of a cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication, either directly or indirectly, with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
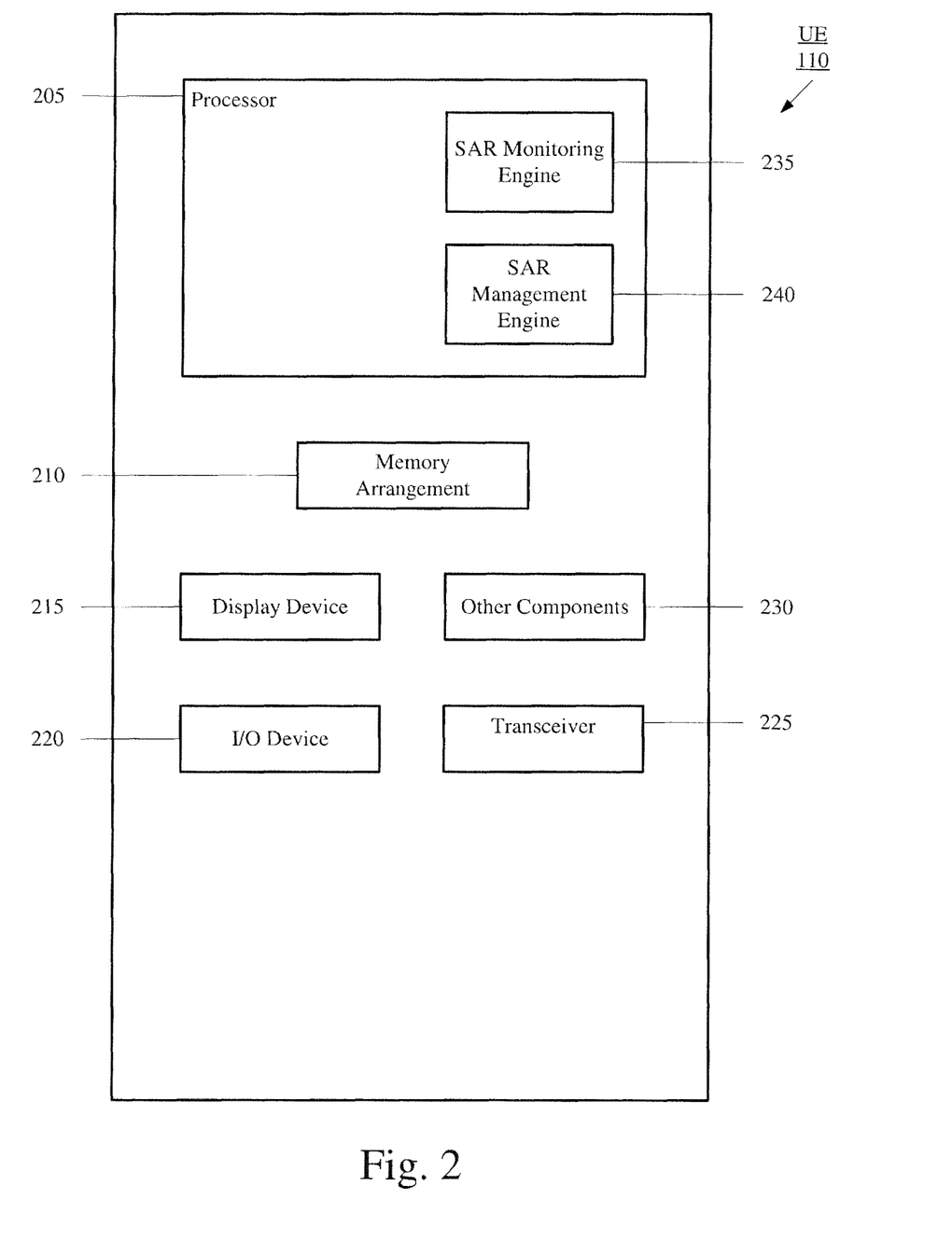
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a plurality of radios 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines of the UE 110. For example, the processor 205 may execute a SAR monitoring engine 235 and a SAR management engine 240. The SAR monitoring engine 235 may be configured to monitor the SAR associated with the UE 110 over a particular time window. The SAR management engine 240 may dynamically adjust one or more parameters that may impact the SAR levels associated with the UE 110. The SAR monitoring engine 235 and the SAR management engine 240 each being an application (e.g., a program) executed by the processor 205 is only exemplary. The functionality associated with either or both of the SAR monitoring engine 235 and the SAR management engine 240 may also be represented as one or more separate, incorporated components of the UE 110 or may be one ore more modular components coupled to the UE 110, e.g., an integrated circuit with or without firmware. For example, the integrated circuit may include input circuitry to receive signals and processing circuitry to process the signals. The engines may also be embodied as one application or separate applications. In addition, in some UEs, the functionality described for the processor 205 is split among two or more processors, such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter input. The display device 215 and the I/O device 220 may be separate components or may be integrated together, such as a touchscreen. The plurality of radios 225 may be hardware components configured to establish a connection with the WLAN 120 or any other type of network (e.g., a 5G NR RAN, an LTE RAN, a legacy RAN, etc.) Accordingly, the plurality of radios 225 may operate on a variety of different frequencies or channels (e.g., set of consecutive frequencies). For example, the UE 110 may establish a connection with the WLAN 120 over the 2.4 GHz band and/or the 5 GHz band.

The plurality of radios 225 may, in part, provide the UE 110 with SDB capability. Accordingly, the UE 110 may establish a first connection to the WLAN 120 over the 2.4 GHZ band using a first radio of the plurality of radios 225 and a second connection to the WLAN 120 over the 5 GHz band using a second radio of the plurality of radios 225. Since both connections are maintained using a different radio, the UE 110 is capable of simultaneous transmission over both the 2.4 GHz band and the 5 GHz band. In certain arrangements, both radios may be configured to utilize a shared antenna or co-located antennas. The exemplary embodiments relate to managing the SAR associated with the UE 110 when the UE 110 is configured to communicate over more than one connection and/or frequency band.

When the UE 110 is in the SDB operating mode, two or more connections may be associated with a different application and/or type of communication. For instance, in one exemplary scenario, the UE 110 may transmit video data over a first frequency band (e.g., first connection) and transmit protocol stack data over a second frequency band (e.g., second connection). In another exemplary scenario the UE 110 may transmit audio data over a first frequency band and background data over a second frequency band. However, any reference to a particular application or type of communication is merely provided for illustrative purposes. The exemplary embodiments may apply to either connection being associated with any application and/or type of communication.

As mentioned above, the SAR limit is a threshold value that is to be compared to the SAR associated with the UE 110 over a time window. When the UE 110 is configured to communicate using more than one radio (e.g., SDB operating mode), the SAR associated with the UE 110 over a time window correlates to the transmit power and duty cycle associated with each radio over the time window. The exemplary embodiments relate to dynamically adjusting the allowed transmit power and/or the duty cycle associated with at least one radio based on the SAR associated with the UE 110 over a time window. Dynamically adjusting the allowed transmit power and/or the duty cycle may include increasing one of these parameters when the difference between the SAR associated with the UE 110 and the SAR limit is more than a predetermined amount and decreasing at least one of these parameters when the difference is less than a predetermined amount. Thus, the exemplary embodiments balance the user experience associated with one or more connections and compliance with the SAR limit. However, reference to transmit power and duty cycle are merely for illustrative purposes, the exemplary embodiments may apply to modifying any parameter(s) that correlates to the SAR associated with the UE 110 over the time window.

From an application perspective, the user experience may be more closely associated with one parameter than another. For example, the user experience associated with an application that transmits multimedia data (e.g., wireless screen mirroring, video calls, live stream, etc.) may depend more on the duty cycle associated with the corresponding radio because the duty cycle correlates to latency. Decreasing the duty cycle would decrease the amount of time in which the radio is in use during a particular period and thus, may increase latency. When streaming multimedia data, an increase in latency may negatively impact throughput and/or the quality with which the device that receives the transmission from the UE may output the multimedia data. In another example, the user experience associated with an application that transmits background data or transmission control protocol (TCP) data may depend more on the transmit power than the duty cycle (e.g., for range). Accordingly, certain applications may prefer the duty cycle to be prioritized over transmit power, while other applications may prefer transmit power to be prioritized over duty cycle. When dynamically adjusting the allowed transmit power, and/or the duty cycle for a radio, the UE 110 may also take into account which parameter the application utilizing the radio would prefer (or prioritize).

For the purposes of dynamically adjusting a parameter based on the SAR associated with the UE 110, the UE 110 may implement a rank table that indicates which parameter(s) an application prefers and an element table that indicates by how much a parameter is to be modified. The rank table will be described below with regard to FIG. 3 and the element table will be described below with regard to FIG. 6. When and how the rank table and the element table are to be utilized will be described below with regard to the method 400 of FIG. 4.

Figure 3:
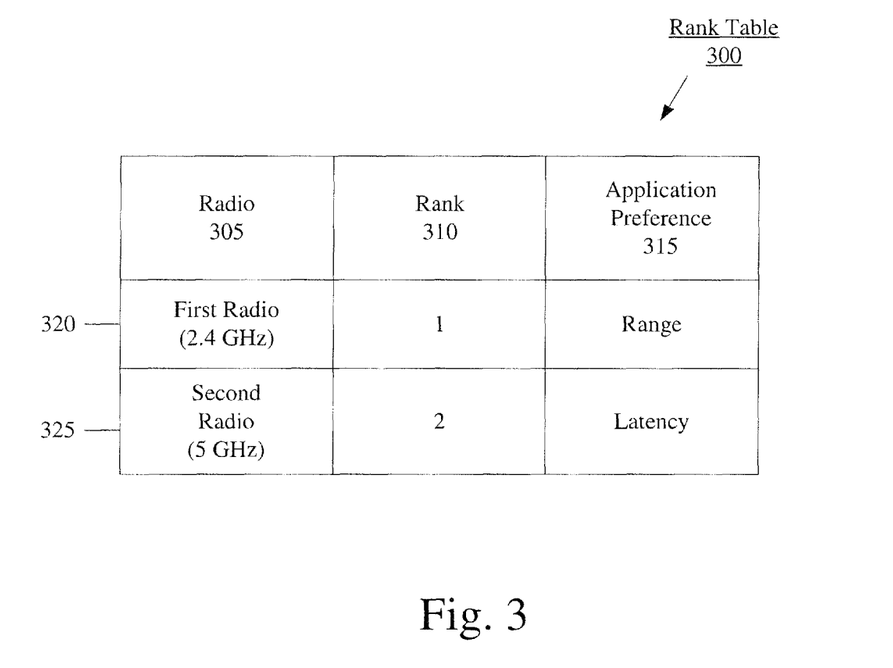
FIG. 3 includes a rank table that indicates which radio and which parameter is to be dynamically adjusted according to various exemplary embodiments.

FIG. 3 includes a rank table 300 that indicates which radio and which parameter is to be dynamically adjusted according to various exemplary embodiments. The rank table 300 will be described with regard to the UE 110 of the FIG. 2, but may be implemented by any device.

During operation, the SAR management engine 240 may populate the rank table 300. In some embodiments, one or more entries in the rank table 300 may be pre-populated, e.g., using default values. The rank table 300 may include a column 305 that identifies one or more radios. The rank table 300 may also include a column 310 that indicates a rank associated with each radio and a column 315 that indicates an application preference associated with each radio. Reference to a table is merely for illustrative purposes. The exemplary embodiments may store this type of information in any appropriate format.

As will be described below with regard to the method 400 of FIG. 4, a combination of rank and application preference may indicate to the UE 110 which radio and which parameter is to be dynamically adjusted. In this example, the rank table 300 shows the first radio, which is configured to use the 2.4 GHz band in the row 320 and column 305. As shown in the row 320, the first radio is associated with rank 1 and its application preference is range. Further, the rank table 300 shows the second radio, which is configured to use the 5 GHz band in the row 325 and the column 305. As shown in the row 325, the second radio is associated with rank 2 and its application preference is latency. The first radio and the second radio being associated with different types of application preference is merely for illustrative purposes. In some instances, both the first radio and the second radio may be associated with the same type of application preference (e.g., both associated with range or both associated with latency).

Rank 1 indicates that the SAR management engine 240 has determined to prioritize the performance of the corresponding radio over the performance of the radio associated with rank 2. Thus, as will be described below with regard to the method 400, the rank table 300 may indicate to the UE 110 that when a parameter is to be increased, the parameter that is to be increased is to correspond to the radio associated with rank 1. Similarly, the rank table 300 may indicate to the UE 110 that when a parameter is to be decreased, the parameter that is to be decreased is to correspond to the radio associated with rank 2.

In this example, an application preference of range indicates that if a parameter associated with the corresponding radio were to be increased a better user experience would result when the transmit power is increased and if a parameter of the corresponding radio were to be decreased to comply with the SAR limit a better user experience would result when the duty cycle is decreased. The application preference of latency indicates that if a parameter associated with the corresponding radio were to be increased, a better user experience would result when the duty cycle is increased and if a parameter associated with the corresponding radio were to be decreased to comply with the SAR limit, a better user experience would result when the transmit power is decreased. However, reference to rank 1, rank 2, range and latency is merely provided for illustrative purposes, the UE 110 may designate a priority and/or preference in any appropriate manner.

The SAR management engine 240 may collect information corresponding to each application and then populate the rank table 300 based at least in part on that information. For example, the SAR management engine 240 may collect information that indicates which radio (e.g., first radio, second radio) is configured to utilize which frequency band (e.g., 2.4 GHz, 5 GHz), the type of data to be transmitted by a radio, the type of application that is to utilize a radio, the application preference (e.g., latency, range) of a particular application, how much data (e.g., an estimate) is to be transmitted, etc. The SAR management engine 240 may also collect measurement data related to the radio frequency (RF) environment of the UE 110. Accordingly, based on the collected data, the SAR management engine 240 may determine the application preference and rank for the first radio and the second radio. Subsequently, the SAR management engine 240 may populate or modify the rank table 300.

Figure 4:
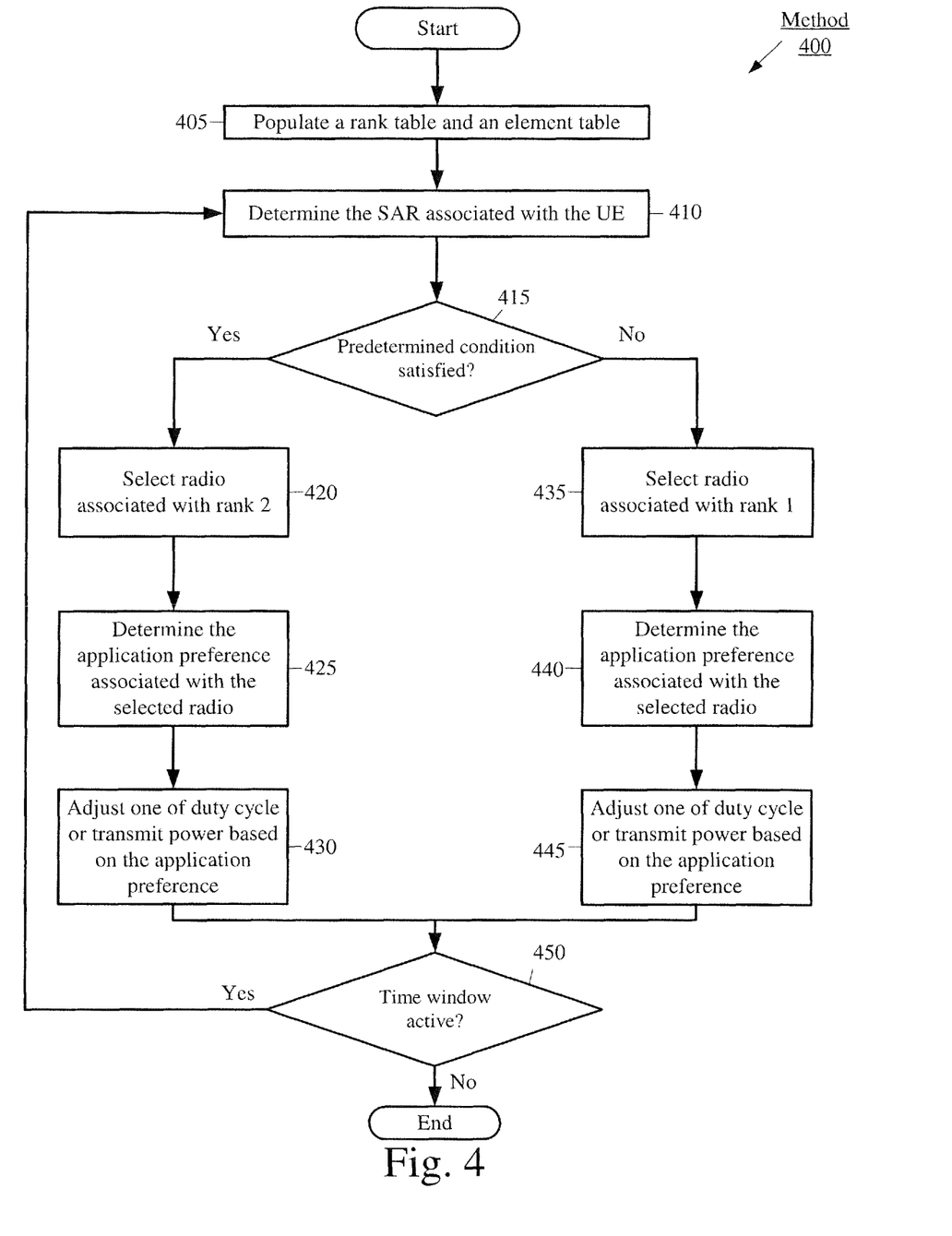
FIG. 4 shows an exemplary method for the UE to dynamically adjust transmission parameters for at least one radio based on the SAR associated with the UE over a time window according to various exemplary embodiments.

FIG. 4 shows an exemplary method 400 for the UE 110 to dynamically adjust transmission parameters for at least one radio based on the SAR associated with the UE over a time window, according to various exemplary embodiments. The method 400 will be described with regard to the UE 110 of FIG. 2 and the rank table 300 of FIG. 3, but may be implemented by any device.

Consider the following exemplary scenario, the UE 110 has established a first network connection using a first radio that is configured to transmit over the 2.4 GHz band. The UE 110 has also established a second network connection using a second radio that is configured to transmit over the 5 GHz band. In this scenario, both the first radio and the second radio are configured to utilize co-located antennas. Further, the first radio is to be utilized by an application that is configured to transmit background data and the second radio is to be utilized by an application that is configured to transmit multimedia data.

In 405, the UE 110 populates a rank table and an element table. For purposes of this example, the SAR management engine 240 populates a rank table that corresponds to the rank table 300 of FIG. 3. Accordingly, for any of a variety of different reasons, in this example the first radio is associated with rank 1 and an application preference of range, while the second radio is associated with rank 2 and an application preference of latency. The element table indicates by how much a parameter is to or may be modified, and will be described below with regard to FIG. 6. The exemplary scenario described above is provided for illustrative purposes and is not intended to indicate that a similar scenario would necessarily cause the SAR management engine 240 to populate a rank table that is equivalent to the rank table 300.

In 410, the UE 110 determines the SAR associated with the UE 110. As mentioned above, when the UE 110 is equipped with co-located antennas, the SAR associated with the UE 110 may correlate to, at least, the allowed transmit power of the first radio, the allowed transmit power of the second radio, the duty cycle of the first radio and the duty cycle of the second radio. The SAR associated with the UE 110 is based on the average SAR over a time window. During operation, the SAR monitoring engine 235 may collect information during the time window and may calculate (e.g., periodically, continually, etc.) the average SAR associated with the UE 110 during the time window.

In 415, the UE 110 determines whether a predetermined condition is satisfied. The predetermined condition may indicate to the UE 110 that the SAR associated with the UE 110 may exceed the SAR limit if a parameter is not adjusted. The predetermined condition may be based on criteria such as, but not limited to, whether a value of the SAR associated with the UE 110 exceeds a predetermined threshold, whether the difference between the SAR associated with the UE 110 and the SAR limit exceeds a predetermined threshold, whether the SAR associated with the UE 110 is within a predetermined range of the SAR limit, whether a parameter (e.g., transmit power, duty cycle) has been set to a certain value for more than a predetermined amount of time, or any other suitable indication(s) that the current parameters are likely to approach, meet, or exceed the SAR limit.

If the predetermined condition is satisfied in 415, the method continues to 420. As will be described below with regard to 420-430, since the SAR associated with the UE 110 is approaching the SAR limit, a parameter (e.g., transmit power, duty cycle) is decreased to ensure compliance with the SAR limit. In contrast, if the predetermined condition is not satisfied in 415, the method continues to 435. As will be described below with regard to 435-445, since the SAR associated with the UE 110 is sufficiently below the SAR limit, one or more parameters (e.g., transmit power, duty cycle) may be increased to improve performance without risk of exceeding the SAR limit.

Figure 5:
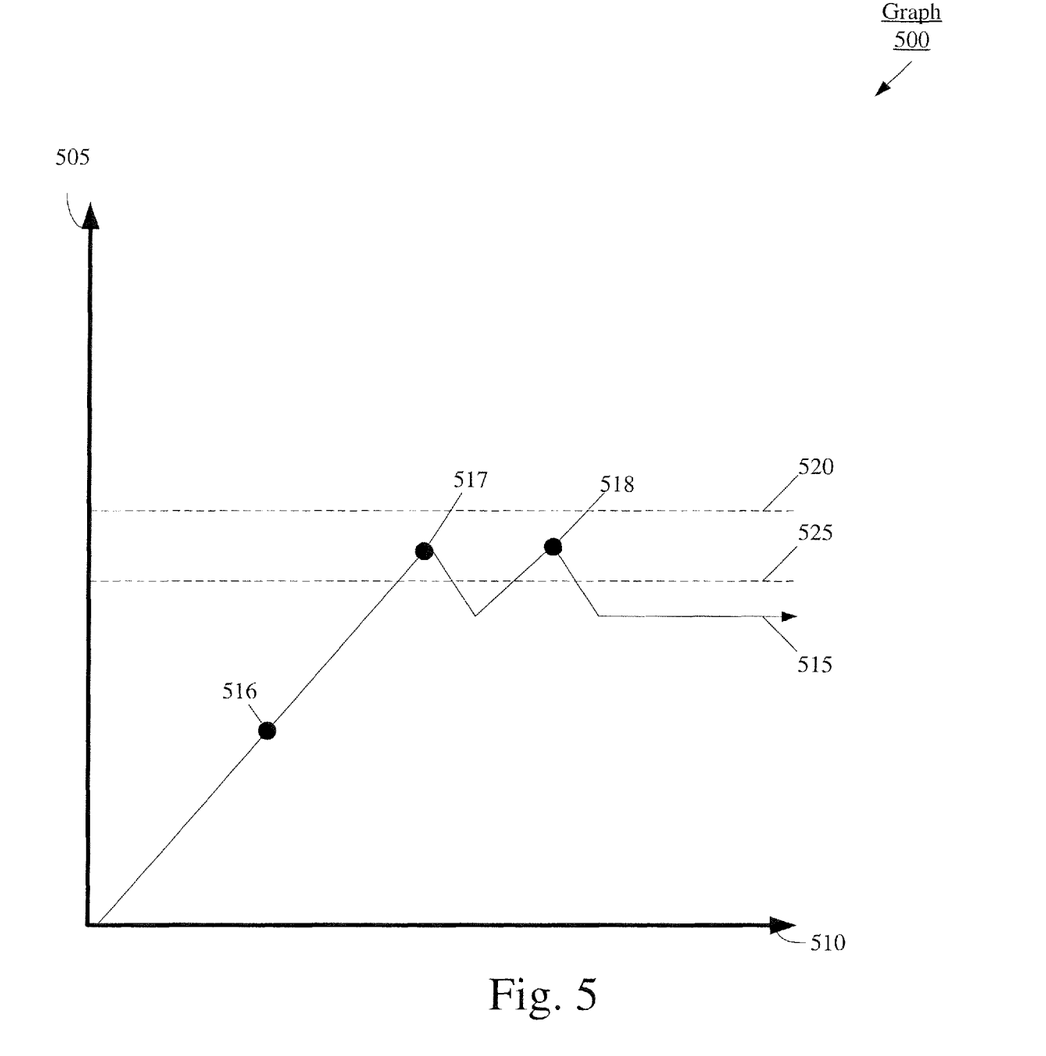
FIG. 5 shows a graph that illustrates examples of when a parameter may be increased and when a parameter may be decreased according to various exemplary embodiments.

FIG. 5 shows a graph 500 that illustrates examples of when a parameter may be increased and when a parameter may be decreased according to various exemplary embodiments. The graph 500 is merely provided as a visual example of when the UE 110 may decide that a parameter is to be increased or decreased, and is not intended to limit the exemplary embodiments to any particular manner of operation.

The y-axis 505 represents SAR values and the x-axis 510 represents time. The line graph 515 represents the average SAR associated with the UE 110 over time. The line 520 represents the SAR limit and the line 525 is a SAR value that indicates to the UE 110 that the SAR associated with the UE 110 may exceed the SAR limit if a parameter is not adjusted.

The line graph 515 includes three points 516, 517, 518. Point 516 shows an instance in which the UE 110 may decide to increase a transmission parameter. At this instance the SAR associated with the UE 110 is not approaching the SAR limit and thus, the UE 110 may increase a transmission parameter to increase performance without the risk of exceeding the SAR limit. Points 517 and 518 show instances in which the UE 110 may decide to decrease a transmission parameter. At these instances the UE 110 is approaching the SAR limit and thus, to ensure compliance with the established SAR limit, the UE 110 may decrease a transmission parameter to decrease the SAR associated with the UE 110, e.g., over time.

Returning to the method 400, in 420, the UE selects the radio associated with rank 2. At this stage, the UE 110 has determined that the SAR associated with the UE 110 is approaching the SAR limit and if a parameter is not changed the SAR limit may be exceeded. As described above, rank relates to priority where rank 1 indicates that SAR management engine 240 has determined to prioritize the performance of the corresponding radio over the performance of another radio, e.g., the radio associated with rank 2. Accordingly, when a parameter is to be decreased to ensure compliance with the SAR limit, the UE 110 decreases a parameter of the radio associated with rank 2 because it is not the prioritized radio. To provide an example, the rank table 300 of the FIG. 3 shows the second radio, which is configured to communicate over the 5 GHz, band is associated with Rank 2. Thus, based on the rank table 300, the second radio would be selected in 420 of the method 400.

In 425, the UE determines the application preference associated with the radio selected in 420. As seen in the rank table 300, the application preference associated with the second radio is latency.

In 430, the UE adjusts one of the duty cycle or transmit power based on the application preference. The amount by which one of these parameters is adjusted is based on the element table, which is described below with regard to FIG. 6. In this example, the application preference is latency. Accordingly, since the application prefers longer duty cycles for lower latency, the UE 110 does not decrease the duty cycle but instead the UE 110 decreases the transmit power corresponding to the second radio. This will lower the average SAR associated with the UE 110 over the time window and thus, enable the UE 110 to ensure compliance with the SAR limit while sacrificing the less important parameter to the corresponding application. Alternatively, if the application preference was range, the UE 110 may reduce the duty cycle to ensure compliance with the SAR limit while maintaining a latency target. Subsequently, the UE 110 operates in accordance with the adjusted parameters and the method 400 continues to 450.

In 450, the UE 110 determines whether the time window is active. If the time window is no longer active, the method 400 ends. However, if the time window is still active, the method 400 returns to 410 where the SAR associated with the UE 110 is once again determined.

Returning to 415, when the predetermined condition is not satisfied, the method 400 continues to 435. In 435, the UE selects the radio associated with rank 1. At this stage, since the SAR associated with the UE 110 is sufficiently below the SAR limit, a parameter (e.g., transmit power or duty cycle) may be increased to improve performance without imminent risk of exceeding the SAR limit. As mentioned above, rank 1 indicates that SAR management engine 240 has determined to prioritize the performance of the corresponding radio over the performance of the radio associated with rank 2 (as well as any other radios). Accordingly, when the state of the SAR associated with the UE 110 indicates that one or more parameters may be increased without exceeding the SAR limit, the UE 110 selects a parameter to increase based on the application preference of the prioritized (e.g., rank 1) radio. To provide an example, the rank table 300 of the FIG. 3 shows the first radio, which is configured to communicate over the 2.4 GHz band, is associated with Rank 1. Thus, based on the rank table 300, the first radio would be selected in 435 of the method 400.

In 440, the UE determines the application preference associated with the radio selected in 435. As seen in the rank table 300, the application preference associated with the first radio is range.

In 445, the UE adjusts one or more parameters based on the application preference. The amount by which one of these parameters is adjusted is based on the element table, which is described below with regard to FIG. 6. In this example, the application preference is range. Accordingly, since the application in this example prefers a higher effective distance, the UE 110 increases the transmit power corresponding to the first radio. This will improve the performance of the first radio, while still not exceeding the SAR limit. Alternatively, if the application preference was latency, the UE 110 may increase the duty cycle to decrease latency. Subsequently, the UE 110 operates in accordance with the adjusted parameters and the method 400 continues to 450.

As mentioned above, in 450, the UE 110 determines whether the time window is active. If the time window is not active, the method 400 ends. However, if the time window is still active, the method 400 returns to 410 where the SAR associated with the UE 110 is once again determined.

Figure 6:
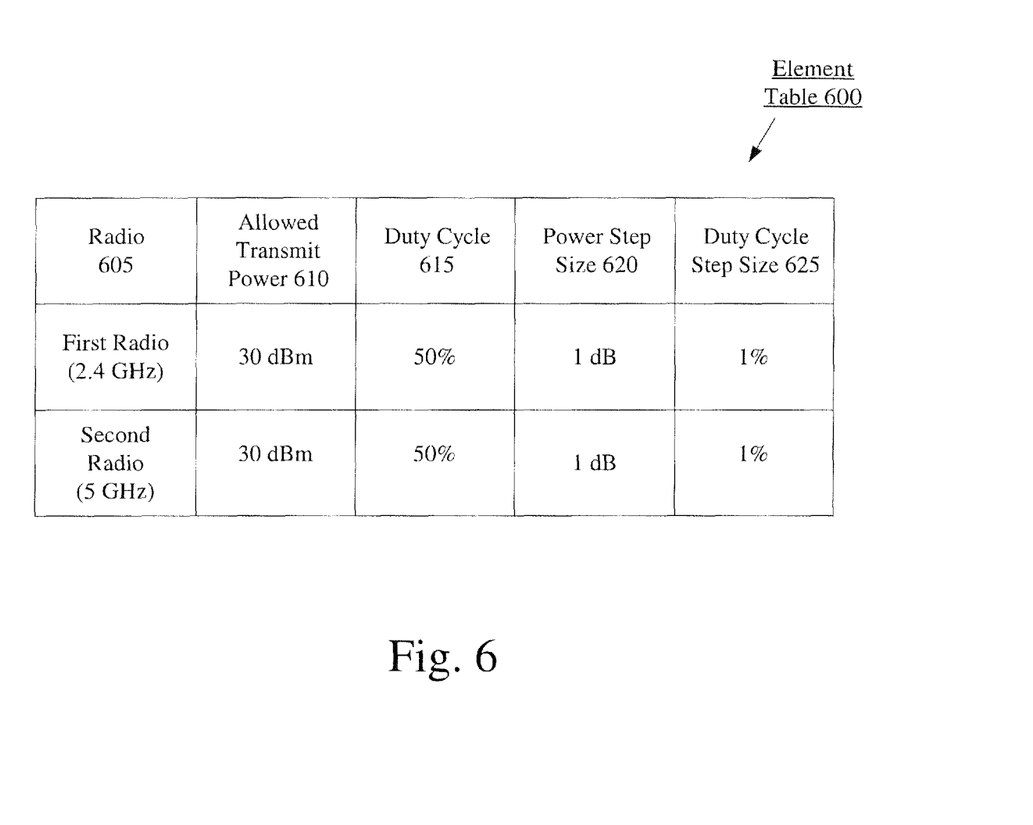
FIG. 6 shows an element table that indicates by how much a parameter is to be modified according to various exemplary embodiments.

FIG. 6 shows an element table 600 that indicates by how much a parameter may modified according to various exemplary embodiments. The element table 600 will be described with regard to the UE 110 of the FIG. 2 and the method 400 of FIG. 4.

As described above in 430 and 445 of the method 400, the UE 110 may determine that an adjustment to one or more parameters (e.g., the duty cycle or transmit power) associated with a radio would improve performance and/or ensure compliance with the SAR limit. To determine by how much a parameter is to be modified the UE 110 may reference the element table 600.

The SAR management engine 240 may populate the element table 600. The element table 600 may include a column 605 that identifies radios involved in the process. The element table 600 may also include a column 610 that indicates an allowed transmit power associated with a corresponding radio. During operation, the UE 110 assigns an initial allowed transmit power to the first radio and the second radio. If the allowed transmit power is adjusted, the entry in the element table 600 may be updated to reflect the adjusted allowed transmit power. To provide an example, the element table 600 indicates an allowed transmit power of 30 decibel-milliwatts (dBm) for each radio. However, this is merely exemplary and each listed radio may be associated with any appropriate transmit power, subject to device limitations, expressed in any appropriate unit.

The element table also includes a column 615 that indicates a duty cycle associated with a corresponding radio. During operation, the UE 110 assigns an initial duty cycle to the first radio and to the second radio. If the duty cycle for a radio is adjusted, the entry on the element table 600 may be updated to reflect the adjusted duty cycle. To provide an example, the element table 600 shows each radio associated with a duty cycle of 50%. However, this is merely exemplary and a radio may be assigned any appropriate duty cycle expressed in any appropriate unit.

Further, the element table 600 includes a column 620 that indicates a power step size associated with each radio. The power step size is the amount by which the allowed transmit power is to be modified (i.e., increased or decreased). In this example, the power step size associated with each radio is 1 decibel (dB). However, this is merely exemplary, other step sizes within the range of at least 0.25 dB to 20 dB may be used. Further, the power step size can be different for different radios. In some embodiments, the power step size is static. In other embodiments, the power step size can be dynamic and can change based on one or more factors such as, but not limited to, any/all of measurement data corresponding to the RF environment of the UE, the difference between the SAR associated with the UE 110 and the SAR limit, the type of data to be transmitted, input from the application, etc. Accordingly, in 430 of the method 400, if the transmit power of the radio is to be decreased it may be decreased based on the corresponding power step size in the element table 600. Similarly, in 445 of the method 400, if the transmit power of the radio is to be increased, it may be increased based on the corresponding power step size of the element table 600.

The element table 600 also includes a column 625 that indicates a duty cycle step size associated with a corresponding radio. The duty cycle step size is the amount by which the duty cycle is to be modified (i.e., increased or decreased). In this example, the duty cycle step size associated with each radio is 1%. However, this is merely exemplary, other step sizes within the range of at least 0.1%-50% may be used. Further, the duty cycle step size can be different for different radios. In some embodiments, the duty cycle step size is static. In other embodiments, the duty cycle step size can be dynamic and can change based on one or more factors such as, any/all of but not limited to, measurement data corresponding to the RF environment of the UE, the difference between the SAR associated with the UE 110 and the SAR limit, the type of data to be transmitted, input from the application, etc. Accordingly, in 430 of the method 400, if the duty cycle of the radio is to be decreased it may be decreased based on the corresponding duty cycle step size in the element table 600. Similarly, in 445 of the method 400, if the duty cycle of the radio is to be increased it may be increased based on the corresponding duty cycle step size in the element table 600.

Those skilled in the art would understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
at a user equipment (UE) configured to establish a first communication connection using a first radio and a second communication connection using a second radio:
determining that a first application associated with the first communication connection is to be prioritized over a second application associated with the second communication connection;
determining a specific absorption rate (SAR) value associated with the UE, wherein the SAR value comprises an average SAR value during a time window, wherein the time window is based on at least one of an occurrence of a predetermined type of event, an occurrence of a predetermined set of criteria, a duration of a network connection, one or more items of measurement data, a request, or a user input; and
modifying, responsive to the SAR value associated with the UE, a parameter associated with the first radio or the second radio based on at least the prioritization of the first application relative to the second application and an application preference associated with the first application or the second application.

2. The method of claim 1, wherein the first application has an associated transmit power parameter and a duty cycle parameter, and wherein the transmit power parameter is prioritized over the duty cycle parameter and modifying the parameter comprises increasing the transmit power parameter from a first value to a second value.

3. The method of claim 1, wherein the first application has an associated transmit power parameter and a duty cycle parameter, and wherein the duty cycle parameter is prioritized over the transmit power parameter and modifying the parameter comprises increasing the duty cycle parameter from a first value to a second value.

4. The method of claim 1, wherein the second application has an associated transmit power parameter and a duty cycle parameter, and wherein the transmit power parameter is prioritized over the duty cycle parameter and modifying the parameter comprises decreasing the duty cycle parameter from a first value to a second value based at least on the transmit power parameter being prioritized over the duty cycle parameter.

5. The method of claim 1, wherein the second application has an associated transmit power parameter and a duty cycle parameter, and wherein the duty cycle parameter is prioritized over the transmit power parameter and modifying the parameter comprises decreasing the transmit power parameter from a first value to a second value based at least on the duty cycle parameter being prioritized over the transmit power parameter.

6. The method of claim 1, wherein an amount by which the parameter is modified is based on at least a step value stored at the UE.

7. The method of claim 1, wherein a priority of the first application is one of:
preconfigured or determined by the UE based at least on one or more operating parameters of the UE.

8. A user equipment (UE), comprising:
a first radio configured to establish a first communication connection;
a second radio configured to establish a second communication connection; and
a processor configured to:
determine that a first application associated with the first communication connection is prioritized over a second application associated with the second communication connection,
determine a specific absorption rate (SAR) value associated with the UE, wherein the SAR value comprises an average SAR value during a time window, wherein the time window is based on at least one of an occurrence of a predetermined type of event, an occurrence of a predetermined set of criteria, a duration of a network connection, one or more items of measurement data, a request, or a user input, and
modify, responsive to the SAR value associated with the UE, a parameter associated with the first radio or the second radio based on at least the prioritization of the first application relative to the second application and an application preference associated with the first application or the second application.

9. The UE of claim 8, wherein the first application has an associated transmit power parameter and a duty cycle parameter, and wherein the transmit power parameter is prioritized over the duty cycle parameter and modifying the parameter comprises increasing the transmit power parameter from a first value to a second value.

10. The UE of claim 8, wherein the first application has an associated transmit power parameter and a duty cycle parameter, and wherein the duty cycle parameter is prioritized over the transmit power parameter and modifying the parameter comprises increasing the duty cycle parameter from a first value to a second value.

11. The UE of claim 8, wherein the second application has an associated transmit power parameter and duty cycle parameter, and wherein the transmit power parameter is prioritized over the duty cycle parameter and modifying the parameter comprises decreasing the duty cycle parameter from a first value to a second value based on, at least, the transmit power parameter being prioritized over the duty cycle parameter.

12. The UE of claim 8, wherein the second application has an associated transmit power parameter and duty cycle parameter, and wherein the duty cycle parameter is prioritized over the transmit power parameter and modifying the parameter comprises decreasing the transmit power parameter from a first value to a second value based on, at least, the duty cycle parameter being prioritized over the transmit power parameter.

13. The UE of claim 8, further comprising:
a memory storing a step value corresponding to the parameter, wherein an amount by which the parameter is modified is based on at least the stored step value.

14. The UE of claim 8, wherein a priority of the first application is one of:
preconfigured or determined by the UE based at least on one or more operating parameters of the UE.

15. An integrated circuit configured for use in a user equipment (UE), comprising:
circuitry configured to determine that a first application associated with a first communication connection is prioritized over a second application associated with a second communication connection;
circuitry configured to determine a specific absorption rate (SAR) value associated with the UE, wherein the SAR value comprises an average SAR value during a time window, wherein the time window is based on at least one one an occurrence of a predetermined type of event, an occurrence of a predetermined set of criteria, a duration of a network connection, one or more items of measurement data, a request, or a user input; and circuitry configured to modify, responsive to the SAR value associated with the UE, a parameter associated with the first radio or the second radio based on at least the prioritization of the first application relative to the second application and an application preference associated with the first application or the second application.

16. The integrated circuit of claim 15, further comprising:
circuitry configured to establish the first communication connection; and
circuitry configured to establish the second communication connection.

17. The integrated circuit of claim 15, wherein a transmit power parameter and a duty cycle parameter are associated with the first application, and wherein modifying the parameter is based on at least a prioritization of the transmit power parameter relative to the duty cycle parameter.

18. The integrated circuit of claim 15, wherein a transmit power parameter and a duty cycle parameter are associated with the second application, and wherein modifying the parameter is based on at least a prioritization of the transmit power parameter relative to the duty cycle parameter.

19. The integrated circuit of claim 15, wherein the second application has an associated transmit power parameter and duty cycle parameter, and wherein the duty cycle parameter is prioritized over the transmit power parameter and modifying the parameter comprises decreasing the transmit power parameter from a first value to a second value based on, at least, the duty cycle parameter being prioritized over the transmit power parameter.

20. The integrated circuit of claim 15, wherein a priority of the first application is one of preconfigured or determined by the UE based at least on one or more operating parameters of the UE.

* * * * *